(12) United States Patent
Gunkel et al.

(10) Patent No.: US 11,985,181 B2
(45) Date of Patent: May 14, 2024

(54) ORCHESTRATING A MULTIDEVICE VIDEO SESSION

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Simon Norbert Bernard Gunkel, Duivendrecht (NL); Hans Maarten Stokking, Wateringen (NL)

(73) Assignees: Koninklijke KPN N.V., Rotterdam (NL); Nederlandse Organisatie Voor Toegepast-Natuurwetenschappelijk Onderzoek TNO, 's-Gravenhage (NL)

(*) Notice: Subject to any disclaimer, the term of this patent is extended or adjusted under 35 U.S.C. 154(b) by 0 days.

(21) Appl. No.: 18/020,405

(22) PCT Filed: Aug. 30, 2021

(86) PCT No.: PCT/EP2021/073851
§ 371 (c)(1),
(2) Date: Feb. 8, 2023

(87) PCT Pub. No.: WO2022/049020
PCT Pub. Date: Mar. 10, 2022

(65) Prior Publication Data
US 2023/0291782 A1    Sep. 14, 2023

(30) Foreign Application Priority Data
Sep. 2, 2020    (EP) ..................................... 20194062

(51) Int. Cl.
*H04L 65/80* (2022.01)
*H04L 65/1093* (2022.01)

(52) U.S. Cl.
CPC .......... *H04L 65/80* (2013.01); *H04L 65/1093* (2013.01)

(58) Field of Classification Search
CPC . H04L 65/80; H04L 65/1093; H04L 12/1827; H04N 7/152; H04N 7/157
See application file for complete search history.

(56) References Cited

U.S. PATENT DOCUMENTS

| | | | |
|---|---|---|---|
| 7,634,575 B2 | 12/2009 | Culbertson et al. | |
| 2005/0099492 A1* | 5/2005 | Orr | H04N 7/147 348/E7.083 |

(Continued)

OTHER PUBLICATIONS

Misra, K., et al.,"An Overview of Tiles in HEVC" IEEE Journal of Selected Topics in Signal Processing, vol. 7, No. 6, pp. 969-977 (2013).

(Continued)

*Primary Examiner* — Bryan Y Lee
(74) *Attorney, Agent, or Firm* — Hamilton, Brook, Smith & Reynolds, P.C.

(57) ABSTRACT

An orchestration system and method are described for at least in part orchestrating a multidevice video session in which a plurality of devices each transmit a video, for example of a user, via a network and in which a composition system receives said transmitted videos and composites, for a respective device from the plurality of devices, videos of other devices into one or more video streams and transmits the one or more video streams via the network to the device. A grouping of the users/devices may be determined to allow the video stream(s) to be generated for respective devices in a manner which may be dependent on the group to which they are deemed to belong. In particular, the video stream(s) may be generated by the composition system such that the videos of devices within a same group are shown in a better quality than the videos of devices from another group, as a (Continued)

250 user of a device may prefer to see the users from the same group in a better quality than the users from another group.

17 Claims, 12 Drawing Sheets

(56) References Cited

U.S. PATENT DOCUMENTS

| | | | | |
|---|---|---|---|---|
| 2013/0106985 A1* | 5/2013 | Tandon | ................ | H04N 7/157 |
| | | | | 348/E7.083 |
| 2014/0114664 A1* | 4/2014 | Khan | ................ | H04N 7/152 |
| | | | | 704/E21.001 |
| 2020/0053419 A1 | 2/2020 | Van Deventer et al. | | |

OTHER PUBLICATIONS

Feldmann, C., et al., "Efficient Stream-Reassembling for Video Conferencing Applications using Tiles in HEVC," Proc. of International Conferences on Advances in Multimedia (MMEDIA) pp. 130-135 (2013).

Cernigliaro, G., et al., "PC-MCU: point cloud multipoint control unit for multi-user holoconferencing systems," Proceedings of the 30th ACM Workshop on Network and Operating Systems Support for Digital Audio and Video, pp. 47-53 (Jun. 2020).

Hirose, et al., "Integrating live video for immersive environments", IEEE Multimedia, 6(3): 14-22 (1999).

International Search Report and Written Opinion for PCT/EP2021/073851, dated Nov. 16, 2021.

* cited by examiner

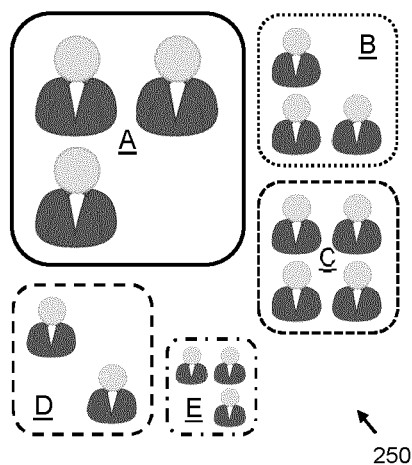 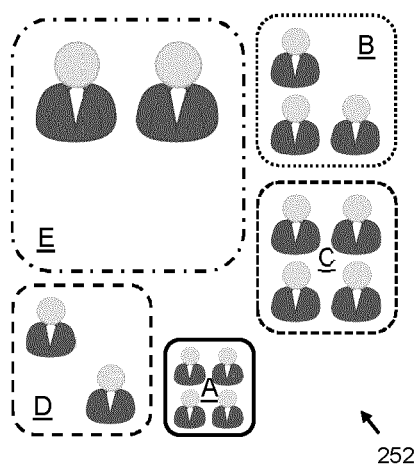
Fig. 6AFig. 6B

ORCHESTRATING A MULTIDEVICE VIDEO SESSION

This application is the U.S. National Stage of International Application No. PCT/EP2021/073851, filed Aug. 30, 2021, which designates the U.S., published in English, and claims priority under 35 U.S.C. § 119 or 365(c) to European Application No. 20194062.4, filed Sep. 2, 2020. The entire teachings of the above applications are incorporated herein by reference.

TECHNICAL FIELD

The invention relates to an orchestration system and method for at least in part orchestrating a multidevice video session in which a plurality of devices each transmit a video via a network and in which a composition system receives said transmitted videos and composites, for a respective device from the plurality of devices, videos of other devices into one or more video streams and transmits the one or more video streams via the network to the device. The invention further relates to the composition system and to a composition method. The invention further relates to a device and method for participating in the multidevice video session. The invention further relates to a data representing a computer program for a processor system.

BACKGROUND

In many applications, there may be a number of devices which each transmit video via a telecommunication network to another device, which in turn may receive the respective videos via the telecommunication network. For example, in video-based multiuser communication, a device may function both as a transmitter device by transmitting a live video recording of a user as a video stream to other devices, and as a receiver device by receiving the video streams of the other devices. The received video streams may then be decoded and displayed by the device, for example simultaneously in a video mosaic or as so-called video avatars in a computer-graphics based environment. Also, it is common to deliver other videos as part of such multi-user communication, e.g., when users watch a movie together, or when one user shares a video with the other users, or when a device captures video of object(s) besides a user, such as a vehicle-mounted camera capturing its surroundings.

A problem in video streaming in which a receiver device receives the video streams of a plurality of transmitter devices is that it may be challenging for the receiver device to receive and decode multiple video streams simultaneously. For example, lower-end receiver devices such as lower-end smartphones may only have one hardware decoder allowing only one video stream to be hardware decoded. The other streams may be software decoded which is typically computationally (much) more intensive. This problem may be aggravated in cases where there are more than two video streams, e.g., one for each of the other participants in a conference call.

This and/or other problems may be addressed by combining such multiple video streams into a composite video stream and transmitting the composite video stream to the receiver device, instead of individually transmitting the multiple video streams. Various techniques may be used to generate such a composite video stream.

For example, with tile-based video encoding [1], the individual video streams may be included in the composite video stream as one or more independently decodable video streams. A video stream may thus be represented in the composite video stream as one or a set of tiles. Such 'tiles' may here and elsewhere also be referred to as 'spatial segments', the composite video stream may here and elsewhere also be referred to as a 'combined video stream', and the tile(s) in the composite video stream which represent a video stream may be referred to as a 'substream' of the composite video stream. If such a single composite video stream is transmitted to a receiver device instead of the multiple original video streams, the video decoding by the receiver device may be greatly facilitated, as the single composite video stream may be decodable by a single hardware or software decoder instance. It will be appreciated that similar advantages may be obtained if the multiple original video streams are reencoded into a single composite video stream in which the individual video streams are not independently decodable. Furthermore, if the multiple individual video streams are combined into a number of, instead of a single, composite video stream, this may generally be advantageous if the number of composite video streams is lower, or even much lower, than the number of original video streams.

In a further example of tile-based video encoding, reference [2] describes a Multipoint Control Unit (MCU) which may disassemble and reassemble the video streams in a video conferencing application so as to create a custom video stream for each client that only includes users that will be rendered by that client in order to use the available bandwidth to full capacity. It is described how in High Efficiency Video Coding (HEVC), the encoder can be modified to enable a reassembling operation that is HEVC compliant and works on a high syntax level in the bitstream. Hereby, no entropy encoding or decoding may be needed for combining the video streams.

A problem of known ways of generating composite video streams may be that the individual video streams may be treated the same when generating the composite video stream(s). This may be problematic if resources are limited relative to the number of individual video streams, which may for example be the case in large-scale video conferences (e.g., with 100+ devices/users). Namely, in such cases, the limited resources may have to be equally shared amongst all video streams, which may result in individual video streams being allocated an insufficient part of the resource. In a specific example, if the bandwidth to a respective receiver device is limited, each individual video stream may only be included in the composite video stream(s) at a low bitrate, which may result in the video streams being delivered at insufficient quality.

A technique referred to as 'dominant speaker detection', see for example [3], may involve identifying one or more dominant speakers in a video conference, which may be used for improving the efficiency of data traffic in video-conferencing. However, such dominant speaker detection may be less suited for multidevice video sessions with a large number of participating devices. Namely, in such video sessions, communication may not be restricted to one active speaker addressing a remaining group of 'listeners', but may rather take different and sometimes more complex forms. For example, in immersive communication sessions in which users share a virtual environment, e.g. in Virtual Reality, there may be multiple speakers which may be differently relevant for different people. In such examples, it may be difficult or even impossible to partition the users into 'dominant speaker(s)' and listeners.

In addition, it may not be always be desired to increase the quality of a 'speaker' at the expense of the 'listeners'. For example, the speaker itself may wish to see the users that he/she is talking to in sufficient quality. As such, it may be desirable to obtain another mechanism besides 'dominant speaker detection' to mitigate resource requirements and utilization in such multidevice video sessions.

Reference [4] describes a method and system for clustering data streams for a virtual environment, which is also further discussed in the summary section.

REFERENCES

[1] K. Misra et al. (2013). An Overview of Tiles in HEVC. In IEEE Journal of Selected Topics in Signal Processing, vol. 7, no. 6, pp. 969-977.
[2] Feldmann, C., Bulla, C., & Cellarius, B. (2013, April). Efficient stream-reassembling for video conferencing applications using tiles in HEVC. In Proc. of International Conferences on Advances in Multimedia (MMEDIA), pp. 130-135.
[3] US20140114664A1
[4] U.S. Pat. No. 7,634,575B2

SUMMARY

It may be desirable to mitigate resource requirements and utilization of multidevice video sessions in a way that is better suited for larger groups of devices.

The following measures may be based on the insight that in multidevice video sessions in which a large group of users participate with their devices, the large group of users may often break into smaller groups in which the users communicate amongst themselves. This may for example occur in video sessions which take place in virtual environments and in which users may seek out each other to form such groups.

The following measures may essentially involve determining a grouping of the users and thereby of the devices, and generating composite video stream(s) for respective devices in a manner which is dependent on the group to which they are deemed to belong. In particular, the composite video stream(s) may be generated such that the videos of devices within a same group are shown in a 'better quality' than the videos of devices from another group, in the expectancy that the user may prefer to see the users from the same group in a better quality than the users from another group. What may be understood under 'better quality' is also elucidated elsewhere.

In a first aspect of the invention, an orchestration system may be provided for at least in part orchestrating a multidevice video session in which a plurality of devices each may transmit a video via a network and in which a composition system may receive said transmitted videos and may composite, for a respective device from the plurality of devices, videos of other devices into one or more video streams and may transmit the one or more video streams via the network to the device.

The orchestration system may comprise:
a communication interface for communicating with the composition system;
a processor subsystem which may be configured to:
determine a grouping of the plurality of devices, the grouping including at least a first group of devices and a second group of devices;
via the communication interface, provide instructions to the composition system to, when generating the one or more video streams for a device from the first group, include a quality-reduced version of respective videos of devices from the second group in the one or more video streams, said quality-reduced version having at least one quality characteristic reduced with respect to the videos of devices from the first group.

In a further aspect of the invention, a computer-implemented method may be provided for at least in part orchestrating the multidevice video session.

The method may comprise:
determining a grouping of the plurality of devices, the grouping including at least a first group of devices and a second group of devices;
providing instructions to the composition system to, when generating the one or more video streams for a device from the first group, include a quality-reduced version of respective videos of devices from the second group in the one or more video streams, said quality-reduced version having at least one quality characteristic reduced with respect to the videos of devices from the first group.

In a further aspect of the invention, a composition system may be provided for use in the multidevice video session. The composition system may comprise:
a network interface to a network;
a processor subsystem which may be configured to:
via the network interface, receive videos transmitted by a plurality of devices which participate in the multidevice video session;
for a respective device from the plurality of devices, composite videos of other devices into one or more video streams; and
via the network interface, transmit the one or more video streams to the device;
a communication interface to an orchestration system;
wherein the processor subsystem may be further configured to:
via the communication interface, receive instructions from the orchestration system, wherein the instructions may indicate to include a quality-reduced version of respective videos of devices from a second group from the plurality of devices in the one or more video streams, said quality-reduced version having at least one quality characteristic reduced with respect to videos of devices from a first group from the plurality of devices;
based on the instructions, when generating the one or more video streams for a device from the first group, include the quality-reduced version of the respective videos of devices from the second group in the one or more video streams.

In a further aspect of the invention, a computer-implemented method may be provided for compositing videos in the multidevice video session.

The method may comprise:
receiving videos transmitted by a plurality of devices which participate in the multidevice video session;
for a respective device from the plurality of devices, compositing videos of other devices into one or more video streams; and
transmitting the one or more video streams to the device;
wherein the method may further comprise:
receiving instructions from the orchestration system, wherein the instructions may indicate to include a quality-reduced version of respective videos of devices from a second group from the plurality of devices in the one or more video streams, said quality-reduced version having at least one quality characteristic reduced with respect to videos of devices from a first group from the plurality of devices;

based on the instructions, when generating the one or more video streams for a device from the first group, including the quality-reduced version of the respective videos of devices from the second group in the one or more video streams.

In a further aspect of the invention, a device may be provided for participating in the multidevice video session. The device may comprise:

a camera interface to a camera;
a network interface to the network;
a processor subsystem which may be configured to:
  using the camera interface, obtain video of the camera;
  via the network interface, transmit the video to the composition system, and receive one or more video streams, wherein the one or more video streams may comprise the videos of the other devices in accordance to a grouping, the grouping including at least a first group of devices and a second group of devices;
  via the network interface, receive metadata which may be indicative of the grouping of the videos of the other devices in the one or more video streams;
  using the metadata, render the videos of the other devices in accordance with the grouping to obtain rendered output for display.

In a further aspect of the invention, a computer-implemented method may be provided of operating a device participating in the multidevice video session.

The method may comprise, by the device:
obtaining video of a camera connected to the device;
transmitting the video to the composition system;
receiving one or more video streams, wherein the one or more video streams may comprise the videos of the other devices in accordance to a grouping, the grouping including at least a first group of devices and a second group of devices;
receiving metadata which may be indicative of the grouping of the videos of the other devices in the one or more video streams; and
using the metadata, rendering the videos of the other devices in accordance with the grouping to obtain rendered output for display.

The above aspects may involve a plurality of devices each transmitting a video via a network to a composition system. The video may typically contain a recording of a user, which may for example be acquired in real-time using a camera which may be integrated or attached to a respective device. In some specific examples, the video acquired of the user may be a 2D video (monoscopic) or 3D video (e.g., stereoscopic or volumetric or holographic) acquired by a corresponding type of camera.

The composition system, which may receive the transmitted videos, may for example be a Multipoint Control Unit (MCU), or a combination of such MCUs and/or Selective Forwarding Units (SFUs), or any other system. The composition system may composite the videos into one or more video streams which may be transmitted to a respective device again. Here, the term 'compositing' may refer to the composition system combining at least two of the received videos into one video stream, with the latter video stream being also referred to as a 'composite' video stream. The compositing may result in various types of compositions, for example a spatial composition ('mosaic') or a data composition which is obtained by including the received videos as independently decodable parts ('substreams') in a larger video stream. Various types of compositions are conceived. In general, a composite video stream may, but does not need to be, decodable by a single hardware decoder or single instance of a software decoder. As a result of the compositing, the one or more video streams which may be generated by the composition system may contain at least one composite video stream which combines two or more individual video streams. In some examples, the composition system may (only) generate one or more composite video streams. In other examples, the composition system may generate one or more composite video streams in addition to transmitting other videos as individual video streams. In general, as a result of the compositing, the number of video streams sent to a device may be less than the number of videos contained in said video streams.

In the above-described multidevice video session, the transmitting devices may thus also act as receiving devices, in that a respective device may both transmit video and receive video. In general, such devices may also be referred to as 'client' devices, and may in specific examples be User Equipment (UE) of a telecommunication network. In some examples, at least some of the devices in the multidevice video session may only transmit video and/or only receive video.

An orchestration system may be provided which may at least in part orchestrate the multidevice video session. Here, the term 'orchestrate' may refer to the orchestration system coordinating and/or configuring at least one aspect of the multidevice video session, for example by sending instructions to entities involved in the multidevice video session. More specifically, the orchestration system may be configured to communicate with the composition system. As also elucidated elsewhere, such communication may take various forms depending on the embodiment of the orchestration system, but may for example include network communication via a network, or internal data communication via for example a software-defined interface. The orchestration system may be configured to determine a grouping of the devices which participate in the multidevice video session. Such grouping may include at least a first group and a second group of devices. The groups may be disjunct, but may also partially, but not fully, overlap. As will be elucidated elsewhere, there may be various mechanisms for the orchestration system to determine such a grouping, but which may be generally be based on metadata associated with the multidevice video session.

Having determined a grouping of devices, the orchestration system may then generate instructions for the composition system so as to control characteristics of the compositing by the composition system. In particular, the orchestration system may instruct the composition system to perform the composition in a group-dependent manner, namely by generating a different type of composition for devices of the first group and for devices of the second group. In particular, the orchestration system may instruct the composition system to generate, for one or more devices of the first group, one or more video streams which include the videos of devices from the second group as quality-reduced version of the respective videos, namely having at least one quality characteristic reduced with respect to the videos of the devices from the first group. Effectively, the composition system may generate one or more video streams for a device from the first group which show the videos of devices from the same (first) group in a better (e.g., non-reduced) quality than the videos of devices from the second group. Conversely, the composition system may generate one or more video streams for a device from the second group which show the videos of devices from the same (second) group in a better quality than the videos of devices from the first group. Such quality-reduced versions of videos may be obtained in various ways, for example by the composition system generating such versions from originally received versions of the videos, e.g., by transcoding, or if multiple versions of a video are available to the composition system, specifically selecting the quality-reduced version of the video. The composition system may generate such group-dependent compositions for all devices from a respective group, or in some cases only for subset of those devices. In addition, the orchestration system may, but does not need to, also perform the composition in a device-dependent manner, for example by not including the video of the device for which the video streams are being composited, or in any other known or novel way.

The above measures may be based on insights from conversational theories which indicate that that in larger groups, there are mainly two modes of communication: a) speech/presentation—one person addresses the whole group, and b) subgrouping—a large group breaks into smaller groups, which may dynamically change but are often fairly stable and often have a size of <10 people. While situation a) may be addressed by the aforementioned prominent speaker detection [3], such techniques fail to offer an adequate solution in situation b). This situation may also become more relevant over time with increased use of video-based telecommunication, for example for business use but also private use (e.g., gaming, social VR, etc.).

In accordance with the above measures, a grouping may be determined between the users, which grouping may reflect a grouping between the devices of the users. This grouping may have occurred in the multidevice video session, either explicitly or implicitly. An example of the former is multidevice video session which takes place in a virtual environment and in which users can move/reposition their avatars and thereby form clusters. An example of the latter is a mosaic-based video session in which gaze detection is used to determine at which users one's attention is focused and to transmit the particular user's audio only or mainly to these users.

In accordance with conversational theories, the people within a particular group may be more relevant to each other than the people from another group. As such, the quality of videos of users from another (second) group may be reduced when compositing the videos for user from a first group. Such reduction may take various forms, including but not limited to a direct reduction, e.g., in terms of spatial resolution, temporal resolution, bit rate, etc., and an indirect reduction, e.g., in terms of prioritization in processing and/or transmitting a particular video (which may affect the latency, which is also a quality-relevant aspect in video conferencing), the type of processing of a particular video, etc. In general, a reduction in the quality characteristic may reduce resource requirements and utilization at one or more of the various entities involved in the multidevice video session. For example, if the videos of users from another group are reduced in spatial resolution, this may reduce the bit rate of the resulting video stream(s) which may reduce the required bandwidth to a client device but also the complexity of decoding the video stream(s) at the client device. A change in prioritization or type of processing by the composition system may reduce the computational complexity of compositing by and at the composition system. Various other examples of reductions in resource requirements and utilization exist as well.

By way of the above measures, larger scale multidevice video sessions, e.g., involving 10+, 100+ or even 1000+ devices, may be performed in a more resource efficient manner. In particular, available resources may be more optimally allocated to ensure that videos that are deemed to be most relevant for a user are delivered in a better quality than those videos which are of lesser relevance to the particular user. It will be appreciated that the above measures may be combined with 'dominant speaker detection' techniques and the like. For example, the transmission of video data of a group to which a user/device is deemed to belong may additionally be optimized with other known methods for high-quality transmission (based on gaze, dominant speaker, etc.), while the video(s) of other groups may be quality-reduced as described above.

It is noted that reference [4] describes clustering data streams for use in a virtual environment. However, reference [4] clusters data streams so as to, if two data streams (e.g., video streams) are similar, collapse them into one stream. Effectively, reference [4] replaces substantially similar data streams by a common data stream. This is fundamentally different from generating video stream(s) for a respective device in a group-dependent manner, showing show the videos of devices from the same group in a better (e.g., non-reduced) quality than videos of devices from another group.

The following embodiments may relate to the orchestration system and method for orchestrating. It will be appreciated, however, that these embodiments imply corresponding embodiments of the composition system and/or the client device, as will be recognized by a person skilled in the art based on this disclosure.

In an embodiment, the multidevice video session may take at least in part place in a virtual environment. The virtual environment may comprise objects displaying the videos of the other devices. The processor subsystem may be configured to: obtain positional data indicative of relative positions of the objects in the virtual environment, and determine the grouping of the plurality of devices based on the positional data.

It is known per se to carry out video-based communication in a virtual environment. Here, the adjective 'virtual' may refer to a computer-based representation, e.g., as defined by computer graphics, rather than a physical one. The virtual environment may be a 3D environment, which may be rendered by a client device or in some examples by the composition system or by another entity; in the latter two cases, pre-rendered video of the 3D environment may be transmitted to the client device.

In the virtual environment, users may be represented by avatars, with the term 'avatar' referring to any suitable representation of the user within the virtual environment. In accordance with the above embodiment, the avatars may be objects which show the respective videos transmitted by the respective devices. It is known to generate such avatars from a live camera recording of a user, see for example reference [5] (see 'further references'). The object on which the video is shown may effectively be a 'virtual display' which may have a humanoid shape, or any other shape.

It is known to enable users to reposition themselves in such a virtual environment. As in the real, physical world, users are known to form clusters in the virtual environment in which separate conversations may take place. The orchestration system may be configured to detect such clustering in the virtual environment, namely by obtaining positional data which may be indicative of the relative positions of the objects (and thereby the avatars) in the virtual environment.

Such positional data may for example be obtained from a central server coordinating the virtual environment, or in any other known way. In a simple example, the positional data may contain X, Y coordinates of avatars in the virtual environment, on which basis the grouping of the user/devices may be performed. This way, the orchestration system may be enabled to determine a relevant grouping of the users/devices in the multidevice video session.

In general, the measures described in this specification may be applied within the context of rendering a virtual environment in Virtual Reality (VR), Augmented Reality (AR), Mixed Reality (MR), together also being called Extended Reality (XR).

In an embodiment, the processor subsystem may be configured to determine the grouping of the plurality of devices by applying a clustering analysis to the positional data to identify at least a first cluster representing the first group and a second cluster representing the second group. Clustering analysis is known per se and may be used to identify clusters of avatars (and thus users, devices) in the virtual environment. These clusters may correspond on a 1:1 basis to the determined groups, or may in some cases serve as a basis for determining the grouping of devices.

In an embodiment, the processor subsystem may be configured to: analyze data, such as video data, audio data and/or metadata, of the multidevice video session to identify verbal or non-verbal social cues between participants of the multidevice video session, and determine the grouping of the plurality of devices based on a result of the analysis of said data. Instead of, or in addition to determining the grouping based on other data, such as the aforementioned positional data, also other data of the multidevice video session may be analyzed. In particular, data may be analyzed which may be indicative of verbal or nonverbal social cues between participants. Such data may in general be representative of conversational behavior of the users. The existence of such cues between participants may then be used to determine the grouping, for example by forming groups which contain participants between which such cues exist, while drawing the boundaries between groups between participants between which such cues do not exist, or to a (significantly) lesser degree. An advantage of using the above-mentioned types of data is that this data may be well indicative of the grouping of users which the orchestration system seeks to determine.

In an embodiment, the processor subsystem may be configured to obtain selection data indicative of a selection of a group for at least one of the plurality of devices, and determine the grouping of the plurality of devices based on the selection data. It may be possible for a group to be selected for a particular user/device, for example by the user him/herself. Such a selection may be encoded in the form of selection data which may be made available to the orchestration system. The orchestration system may then determine the grouping based on such data. This may for example allow a group to be manually selected or an automatically selected group to be overridden, for example if the grouping was erroneous or not applicable anymore.

In an embodiment, the processor subsystem may be configured to:
  generate metadata which may be indicative of the grouping of the videos of the other devices in the one or more video streams; and
  via the communication interface, provide the metadata to the composition system for transmittal to the device from the first group, or directly to the device from the first group, to enable the device to identify and render the videos of the other devices in accordance with the grouping.

The grouping of devices may also be relevant for the client device, for example render the received video streams in accordance with the grouping. Accordingly, the orchestration system may generate metadata which may be indicative of this grouping and provide the metadata to the client device, either directly or via another entity, such as the composition system. For example, the metadata may identify a location of videos in the received video stream(s) and indicate which videos belong to which groups. Another example is that the metadata may identify a particular group, e.g., by a label or other identifier, or identify properties to be used in the rendering of the video stream(s) of the group, e.g., an absolute or relative position. Such an identifier can also be indicative for the (spatial) rendering of any associated audio (or any other auxiliary data stream) relating to a group or individual user.

In an embodiment, the processor subsystem may be configured to provide instructions to at least one device from the second group to generate the quality-reduced version of a respective video and to transmit the quality-reduced version to the composition system, wherein the instructions to the composition system may instruct the composition system to include the quality-reduced version in the one or more video streams for the device from the first group. Alternatively, or in addition to the composition system generating quality-reduced versions of videos, such quality-reduced versions may also be generated by the devices transmitting the videos, for example by transcoding or by adjusting recording parameters. As such, the orchestration system may instruct one or more devices to generate such quality-reduced versions of their videos and transmit these to the composition system. In some embodiments, a client device may generate multiple versions of a video, for example as respective representations when using a Scalable Video Coding (SVC, Annex G extension of the H.264/MPEG-4 AVC video compression standard), and make these available to the composition system, which may then select amongst the different quality layers. In some embodiments, a client device may generate such multiple and/or quality-reduced versions of videos even without receiving instructions from the orchestration system. An advantage of this embodiment may be that the computational complexity of generating the quality-reduced versions of videos may be distributed over multiple entities, e.g., over the devices or over the composition system and the devices.

In an embodiment, the processor subsystem may be configured to, via the instructions to the composition system, instruct the composition system to generate the quality-reduced version from respective videos received from the devices from the second group, for example by transcoding the respective videos. In accordance with this embodiment, the composition system may generate quality-reduced versions of at least some of the videos received from the devices. Such quality reduction may be obtained in various ways, for example by transcoding the videos to a lower bit rate, spatial resolution and/or temporal frame rate, by deprioritizing a processing or transmittal of the video, or by selecting a different processing technique, etc.

In an embodiment, the composition system may comprise a multipoint control unit, MCU, and a selective forwarding unit, SFU, and the processor subsystem may be configured to instruct the composition system to generate the one or more video streams for the device from the first group by:

instructing the multipoint control unit to generate the quality-reduced version from the respective videos received from the devices from the second group and to composite said quality-reduced versions into a composite video stream;

instructing the selective forwarding unit to forward videos from other devices from the first group to the device from the first group.

In accordance with this embodiment, the videos of devices from another (second) group may be processed by a MCU, which may then generate the quality-reduced versions thereof and transmit the quality-reduced versions as a composite video stream to the device from the first group, while the videos from other devices from the first group may be forwarded by an SFU and thereby without being subjected to an (additional) quality reduction. An advantage of this embodiment may be that only those videos of which the quality is to be reduced may need to be handled by the MCU, while other videos may be simply forwarded to a client device by an SFU. This may reduce the need for additional MCUs and/or the resource allocation at such MCUs.

The following embodiments may relate to the composition system and method for compositing It will be appreciated, however, that these embodiments imply corresponding embodiments of the orchestration system and/or the client device, as will be recognized by a person skilled in the art based on this disclosure.

In an embodiment, the at least one quality characteristic which is reduced is at least one of: a spatial resolution, a temporal resolution, an encoding quality, a processing latency, a transmission latency, and a preprocessing quality when preprocessing a video. The quality may thus be reduced in various ways, which may for example involve directly changing a video, e.g., by transcoding, or by changing a priority or type of processing, or by changing a priority or type of transmission.

In an embodiment, the processor subsystem may be configured to, based on the instructions, generate the quality-reduced version from respective videos received from the devices from the second group, for example by transcoding the respective videos. As such, the composition system may generate quality-reduced versions of at least some of the videos received from the devices.

In an embodiment, the processor subsystem may be configured to generate the one or more video streams by:
generating a composite video stream which includes the videos of the devices from the first group and the second group; or
generating at least a composite video stream which includes the videos of the devices from the second group in separation of the videos of the devices from the first group.

The video stream(s) generated by the composition system for a device may take various forms. For example, the composition system may generate a single composite video stream which contains the videos of the devices from the first and second groups, or in general, of all the devices. Another example is that at least one separate composite video stream may be generated for the videos of the devices from the second group, which may for example be jointly composited to provide a 'group view' or a similar arrangement at a reduced quality. The videos of any devices from the first group may then be separately transmitted to the device from the first group.

In an embodiment, the plurality of devices may be grouped into the first group, the second group and at least a third group, wherein the composition system may be configured to use the reduced quality version of the respective videos of the devices from the second group for generating the one or more video streams for the device from the first group and for a device from the third group. Effectively, the reduced-quality versions which may be generated of the videos of devices from the second group for devices of the first group may be reused when generating video streams for devices of a third group. An advantage of this embodiment may be that reduced-quality versions of videos of a group may be reused for multiple other groups, thereby reducing the computational complexity of generating such versions of videos.

In an embodiment, the composition system may comprise at least one of: a multipoint control unit (MCU) and a selective forwarding unit (SFU). The composition system may be comprised of multiple entities, such as any combination of MCUs and SFUs. Instructions sent by the orchestration system to the composition system may be comprised of individual instructions for each of the entities. For example, the orchestration system may instruct an MCU and an SFU so as to have the MCU and the SFU jointly generate the one or more video streams for a device of a respective group.

In an embodiment, the composition system may comprise the orchestration system. The orchestration system may thus be a subsystem of the composition system.

In an embodiment, the composition system and the orchestration system may be respective subsystems of another system. In other words, the composition system and the orchestration system may both be part of a supra-system.

The following embodiments may relate to the device and method for operating the device. It will be appreciated, however, that these embodiments imply corresponding embodiments of the orchestration system and/or the composition system, as will be recognized by a person skilled in the art based on this disclosure.

In an embodiment, the device may comprise a user interface subsystem to enable a user to interact with the device, wherein the processor subsystem may be configured to:
via the user interface system, receive a selection of a group to which the device is to belong to in the grouping of the plurality of devices; and
via the network interface, transmit selection data indicative of the selection of the group to an orchestration system which is configured to at least in part orchestrate the multidevice video session and to determine the grouping.

In accordance with this embodiment, a user may be enabled to manually select the group to which he/she wishes to belong to, or to override an automatically selected group, for example if the grouping was erroneous or not applicable anymore. For example, the user interface subsystem may comprise a display output to a display and a user input interface to a user input device, such as a mouse, keyboard, etc. The display output may be used to display a graphical user interface onscreen. The user input interface may be used to receive user input from the user operating the user input device. Various other types of user interface subsystems are equally conceived.

In a further aspect of the invention, a computer-readable medium may be provided which may comprise transitory or non-transitory data representing a computer program. The computer program may comprise instructions for causing a processor system to perform any one or combination of methods described in this specification.

In accordance with an abstract of the specification, an orchestration system and method may be described for at least in part orchestrating a multidevice video session in which a plurality of devices each may transmit a video, for example of a user, via a network and in which a composition system may receive said transmitted videos and may composite, for a respective device from the plurality of devices, videos of other devices into one or more video streams and transmit the one or more video streams via the network to the device. A grouping of the users/devices may be determined to allow the video stream(s) to be generated for respective devices in a manner which may be dependent on the group to which they are deemed to belong. In particular, the video stream(s) may be generated by the composition system such that the videos of devices within a same group are shown in a better quality than the videos of devices from another group, as a user of a device may prefer to see the users from the same group in a better quality than the users from another group.

It will be appreciated by those skilled in the art that two or more of the above-mentioned embodiments, implementations, and/or aspects of the invention may be combined in any way deemed useful.

Modifications and variations of any one of the systems (e.g., orchestration system, composition system) or devices, methods and/or computer programs, which correspond to the described modifications and variations of another one of these systems or devices, methods and/or computer programs, and vice versa, may be carried out by a person skilled in the art on the basis of the present description.

FURTHER REFERENCES

[5] Hirose et al., Integrating live video for immersive environments, IEEE Multimedia 6.3, 1999, pp. 14-22.
[6] Cernigliaro et al., PC-MCU: point cloud multipoint control unit for multi-user holoconferencing systems, MMSys '20, 2020

BRIEF DESCRIPTION OF THE DRAWINGS

These and other aspects of the invention are apparent from and will be elucidated with reference to the embodiments described hereinafter. In the drawings.

FIG. 6A shows a composition of the videos for a device from group A;

FIG. 6B shows a composition of the videos for a device from group E;

Figure 1:
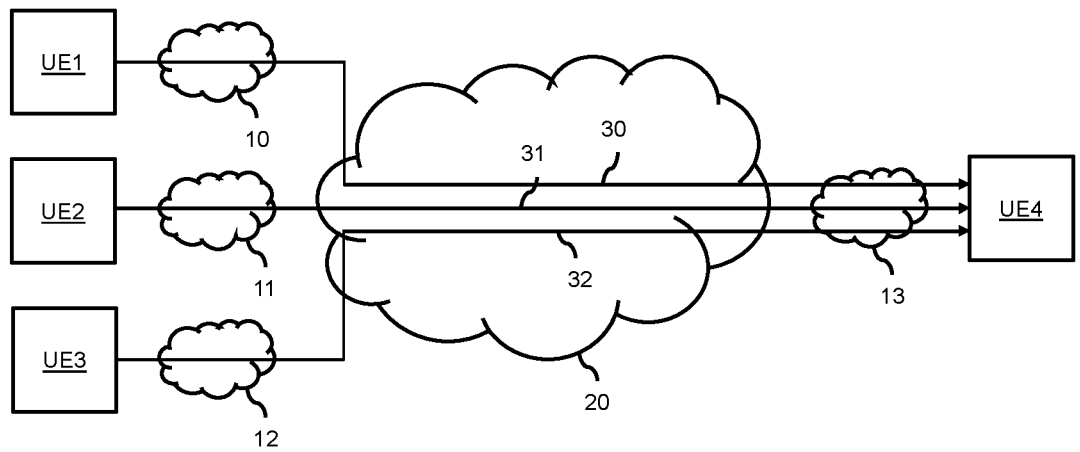
FIG. 1 shows a plurality of transmitter devices each transmitting a respective video via a telecommunication network and a receiver device receiving the respective videos via the telecommunication network, with said devices being connected to the telecommunication network via respective access networks.

It should be noted that items which have the same reference numbers in different figures, have the same structural features and the same functions, or are the same signals. Where the function and/or structure of such an item has been explained, there is no necessity for repeated explanation thereof in the detailed description.

REFERENCE SIGNS LIST

The following list of references and abbreviations is provided for facilitating the interpretation of the drawings and shall not be construed as limiting the claims.

A-E group
HMD head-mounted display
MCU multipoint control unit
SFU selective forwarding unit
UE(X) user equipment (X)
10-13 access network
20 telecommunication network
30-32 video stream
40 original version of video
50 reduced-quality version of video
60 data communication to/from UE
70-74 data communication to/from composition system
100 capture
110 encode
112 tile/encode
120 decode
130 composite (in uncompressed domain)
132 composite (in compressed domain)
140 encode
150 decode
160 split/render
200 virtual environment
210 video avatars
220, 222 distance between video avatars
230-238 group
240-246 virtual camera
250 composition of video streams for device of group A
252 composition of video streams for device of group E
300 orchestration system 320 network interface
322 data communication
340 processor subsystem
360 data storage
400 composition system
410 selective forwarding unit (SFU)
412 multipoint control unit (MCU)
420 network interface
422 data communication
440 processor subsystem
460 data storage
500 (client) device
510 camera
520 camera interface
522 camera data
530 network interface
532 data communication
540 processor subsystem
560 user input interface
562 user input data
570 user input device
580 display output
582 display data
590 display
600 computer-readable medium
610 non-transitory data
1000 exemplary data processing system
1002 processor
1004 memory element
1006 system bus
1008 local memory
1010 bulk storage device
1012 input device
1014 output device
1016 network adapter
1018 application

DESCRIPTION OF EMBODIMENTS

Some of the following embodiments are described within the context of 'Social VR' where a number of users may participate in a multi-device video session which may take place in a virtual environment which may be viewable in VR and in which users may be represented by so-called 'video avatars'. However, the techniques described in the following embodiments may also be used in any other context in which a plurality of devices may each transmit a respective video via a telecommunication network and receive videos of other devices via the telecommunication network, for example in any non-VR type of video conferencing application, for example one in which the videos of users are shown in a mosaic, or in a gaming application, etc.

It is noted that each one of the videos described in this specification may be a 2D video or a 3D video. It will be appreciated that a 3D video may take various forms, such as stereoscopic (e.g., a series of left+right video frames) or volumetric (e.g., point-based or mesh-based) or holographic (e.g., a sampling of a light field) video. A respective video may be acquired by a corresponding type of camera, or may be obtained by conversion of another type of acquired video. For example, a point-cloud based video may be obtained by conversion from a so-called 2D+depth video.

It is further noted that in the following, any reference to a 'video stream' may refer to a data representation of a video which is suitable for being streamed, e.g., using known streaming techniques. Furthermore, a reference to a 'video' may include a video stream but also a data representation of the video which is not (yet) suitable for being streamed or at least conventionally not intended for streaming. In the Figures, video (streams) may be schematically represented by a single video frame/image.

FIG. 1 shows a plurality of transmitter devices UE1-UE3 each transmitting a respective video via a telecommunication network 20 in a streaming manner (which is elsewhere also simply referred to as 'streaming'). Such streaming is indicated in FIG. 1 by arrows 30-32. FIG. 1 further shows a receiver device UE4 receiving the respective videos 30-32 via the telecommunication network 20. Each of the devices UE1-UE4 is shown to be connected to the telecommunication network 20 via a respective access network 10-13. In the example of FIG. 1, the telecommunication network 20 may be a 5G or later generation telecommunication network to which the devices, being here 'User Equipment' (UE), may be connected via respective radio access networks 10-13. In other examples, the telecommunication network 20 may be the Internet, and the access networks 10-13 may be DSL or fiberoptic-based access networks. Various other examples of telecommunication networks and access networks exist as well. In other examples, the devices may access the telecommunication network 20 without respective access networks. For example, all devices may be part of one network.

Although not shown in FIG. 1, in some embodiments, each transmitter device may also be a receiver device and vice versa, in that each device UE1-UE4 may receive the videos of the other devices and transmit its own video to the other devices. This may for example be the case in video conferencing. In other embodiments, some but not all of the transmitter devices may also be receiver devices and/or vice versa. In other embodiments, transmitter devices may only transmit video and do not receive video while receiver devices may only receive video and do not transmit video.

A drawback of the situation shown in FIG. 1 may be that the receiver device UE4 may need to individually decode the received video streams 30-32, which may be challenging in case the receiver device has only one or a small number of hardware decoder, and/or insufficient resources to run several instances of a software decoder.

Figure 2:
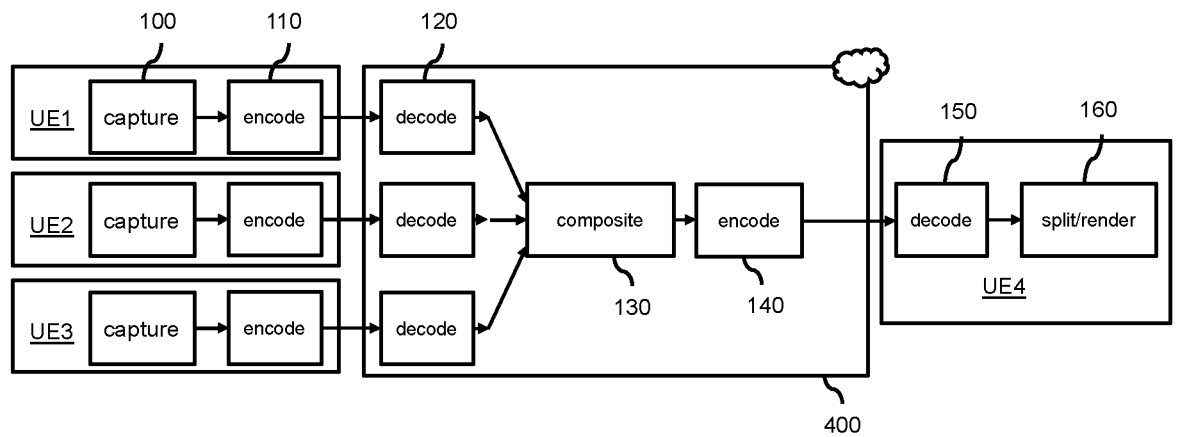
FIG. 2 shows a plurality of transmitter devices each capturing, encoding and transmitting a video, and a composition system in the telecommunication network decoding, compositing and re-encoding the videos to obtain a composite video stream, and a receiver device receiving and decoding the composite video stream.

FIG. 2 is similar to FIG. 1 but shows a composition system 400 compositing the video streams of the transmitter devices UE1-UE3 into a composite video stream which may then be transmitted to the receiver device UE4. For sake of simplicity of the figures, FIG. 2 and following omit showing the access networks and the telecommunication network. More specifically, each transmitter device UE1-UE3 is shown to capture 100 a respective video, e.g., using a built-in or connected camera or a set of cameras. Such capture may be 'live' and thus performed in real-time. However, in other examples, the capture may have taken place at an earlier moment in time. In a specific other example, a video may have been captured by another entity and may then be retransmitted by the transmitter device. The captured video may then be encoded 110 by the transmitter device. Such encoding may involve using video compression to reduce the bitrate of the video, for example using lossy and/or loss-less video compression. Such encoding may involve formatting the video as a video stream. In other examples, the transmitter device may directly obtain the video as a video stream. The resulting video stream may then be transmitted by the respective transmitter device UE1-UE3 via the access network and telecommunication network to the composition system 400, which in turn may receive the transmitted video streams.

In the example of FIG. 2, the composition system 400 shown to composite the videos in the uncompressed domain into a single video. For that purpose, the composition system 400 may decode 120 each individual video stream, composite 130 the decoded videos into a composite video and then encode 140 the composite video to obtain a composite video stream for transmission to the receiver device UE4. The receiver device UE4 may then decode 150 the received composite video stream and render 160 the decoded video. Such rendering is here and elsewhere also referred to as 'split/render', referring to the fact that the videos may be split into individual parts again, e.g., to allow various compositions in the rendered output such as placing the videos as avatars in a graphics-based environment. In some examples, the receiver device UE4 may then display the rendered output on an internal or external display.

Compared to the FIG. 1 example, the computational load on the receiver device UE4 may be reduced in the FIG. 2 example by having only to decode one composite video stream, instead of several individual video streams simultaneously. Even if a number of video streams is received from the composition system 400, this may represent a reduction in computational load if the number of received video streams is lower than the number of individual videos, e.g., by at least one of the received video streams comprising a composite of two or more individual videos.

Figure 3:
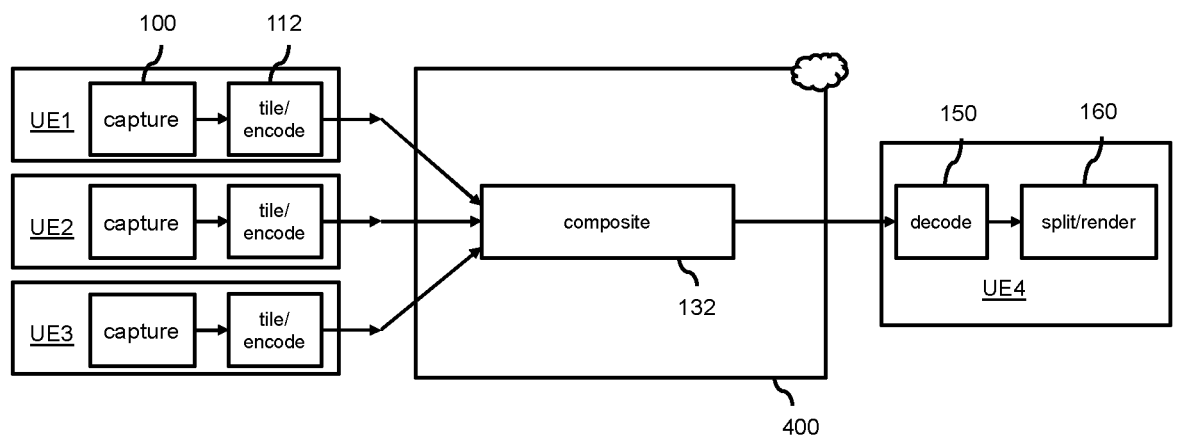
FIG. 3 is similar to FIG. 2, but shows the transmitter devices each encoding its video as independently decodable tile(s) and the composition system compositing the videos in the compressed domain to obtain a tile-based composite video stream.

FIG. 3 is similar to FIG. 2 but shows a composition system 400 compositing the video streams of the transmitter devices UE1-UE3 into a composite video stream in the compressed domain. More specifically, the plurality of transmitter devices UE1-UE3 are each shown to capture 100 and in a tiled manner encoding 112 the respective captured video to obtain respective tile-based video streams. Here, the term 'encoding a tiled manner' may refer to encoding the video in such a way that it is suitable for use as a tile in a larger configuration of tiles. Such tile-based video encoding is known per se, e.g., from HEVC tiled streaming [1], [2], and may allow the composition system 400 to composite 132 the tile-based video streams in the compressed domain to obtain a composite tile-based video stream. The composite tile-based video stream may then be transmitted to the receiver device UE4 which may receive and decode 150 the composite tile-based video stream, after which the videos may be rendered 160.

In the FIGS. 2 and 3 examples, the composition system is shown to be a cloud-based server which is symbolically indicated in FIGS. 2 and 3 by a cloud symbol, and which may in general be any suitably configured network node or combination of network nodes used together for this purpose, typically referred to as a 'cloud'. Examples of such network nodes include, but are not limited to, Multipoint Control Units (MCUs) and video conferencing bridges and, in the case of VR-based teleconferencing, VR bridges, with the type of server depending on the technical and application-specific context. It will be appreciated, however, that such examples are not limiting. For example, instead of a cloud-based server, the composition system may be embodied by one or a combination of edge nodes of a telecommunication network. In a specific example, the composition system may be embodied by a distributed system of edge nodes, with the composition for a particular receiver device being performed by a subset of one or more edge nodes which are nearest to the respective receiver device.

With continued reference to FIGS. 2 and 3, it will be appreciated that the videos which may be transmitted from the transmitter devices may be processed before rendering. A specific example for VR is so-called Head Mounted Display (HMD) removal, which may be used to detect the HMD in a video captured of a user during a Social VR session and to replace the HMD by a corresponding rendered part of a 3D model of the user. Such HMD removal is known per se, and may assume a 3D model of the user's face to be available or generatable, e.g., as a UV projection. A relevant part of the user's face may be selected from the user's 3D model, appropriately sized, adjusted for color and lighting differences between the model and the video frame, and then overlaid over the detected HMD. Alternatively, or additionally, other kinds of processing are possible, including foreground/background segmentation, object detection, object annotation, object insertion, object transformation, object replacement, 3D reconstruction, etc. Such processing may be performed by the transmitter devices, but also by the composition system and/or the receiver devices.

The following describes how the compositing of videos by a composition system in a multidevice video session may be orchestrated by an orchestration system. More specifically, an orchestration system is described which may determine a grouping of devices in the multidevice video session and instruct the composition system to perform the compositing of the videos in a group-dependent manner.

Figure 4A:
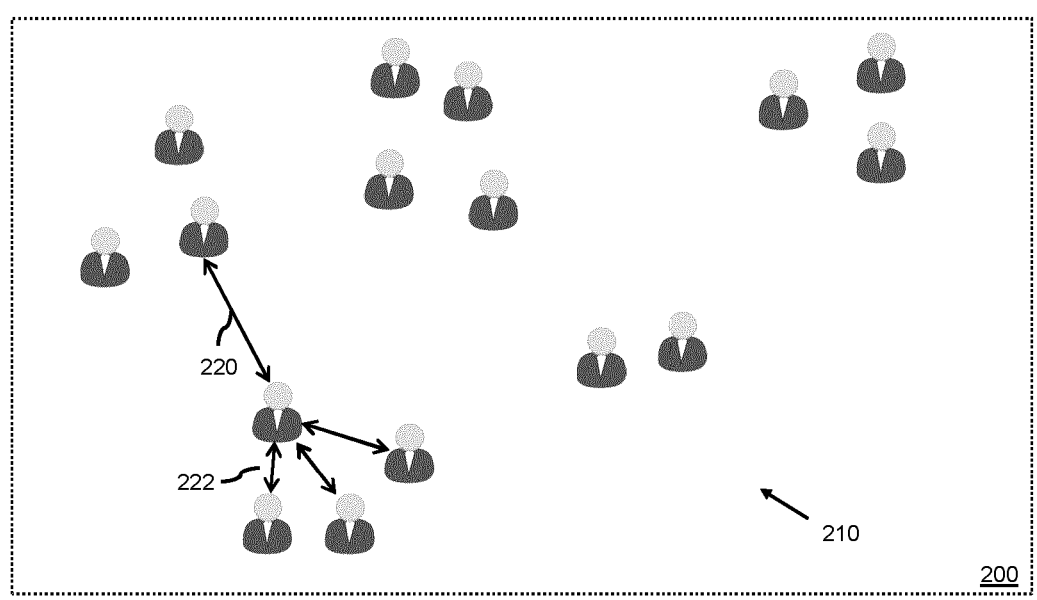
FIG. 4A shows a virtual environment comprising video avatars of participants of a multi-device video session taking place in the virtual environment.

FIG. 4A shows a virtual environment 200 which comprises video avatars 210 of participants of a multi-device video session. The virtual environment is shown schematically in FIG. 4A as a top-down view of a rectangular environment, but may in general be any type of virtual environment, such as a graphics-based 2D or 3D environment. In some examples, the virtual environment may be rendered to a user from a viewpoint of his/her video avatar, for example in VR and using an HMD. In such examples, the virtual environment may be a VR environment. The video avatar itself may, from the perspective of other users in the virtual environment, represent the user in the virtual environment by showing the video of the respective user, or by otherwise being generated based on the video of the respective user. This may for example be obtained by projecting the video onto an object in the virtual environment, such as a humanoid-shaped object or any other type of object. In such examples, the object may at least partly represent a 'virtual display' by having a part on which the video may be shown. A non-limiting example of a video avatar is given by [5]. In other examples, an object may be animated, for example based on information derived from the video. For example, the object may be a 3D model of a humanoid which may be customized and animated to represent the user. This may for example involve detecting features, such as the eyes, lips, hands, etc., and their movement in the video of the user, and customizing and/or animating corresponding features of the 3D model of the user.

In some examples, the originally acquired video may show the user and the user's immediate surroundings, which may in many cases be a background before which the user may be standing or sitting. The background may be omitted from being displayed in the virtual environment, for example by the video being processed using so-called 'background removal' techniques, and/or by metadata being provided which may allow the video data to be segmented into a user part and a background part and allow the receiver device to selectively render the user part of the video data.

The orchestration system may determine a grouping of the plurality of devices which take part in the multidevice video session. Such a grouping may include at least a first group of devices and a second group of devices, but in many examples also more, or even many more, groups. The grouping may reflect a grouping of the users associated with the devices. Such users may elsewhere also be referred to as 'participants'. As such, a grouping of devices may correspond to a grouping of users, and vice versa. Both types of groupings may be referred to interchangeably in this specification. The grouping may be determined in various ways. For example, the grouping may be determined based on the positions of the users in the virtual environment. Since the users may be represented in the virtual environment by objects, e.g., by the aforementioned video avatars 210, the grouping may in fact be based on the positions of the video avatars or other objects. For that purpose, the orchestration system may obtain positional data indicative of the relative positions of the objects in the virtual environment, and determine the grouping of the plurality of users/devices based on the positional data, for example by applying a clustering analysis to the positional data. In the example of FIG. 4A, the clustering analysis may then take into account that the distances of one particular user to some users may be smaller than the distance of the user to other users, this being indicated by reference numerals 222 in FIG. 4A indicating relatively short distances to some users (thereby identifying nearby users) and reference numeral 220 indicating a longer distance to another user.

In general, the positional data may take various forms, including but not limited to a list of coordinates indicative of a position of a respective user (e.g., as XY or XYZ coordinates) or any other identifiers which may indicate the position. For example, if the virtual environment comprises a number of rooms, the positional data may be indicative of which room a user is located in, e.g., room A or room B. The positional data may be obtained from an application server which hosts the virtual environment. For example, if the multidevice video session takes place in a gaming environment, the positional data may be obtained from an application server of the gaming environment.

Additionally, or alternatively to using positional data, also other types of data of the multidevice video session may be used to determine the grouping of the users/devices. For example, a user may not only have a position in the virtual environment but also an orientation, such as a body orientation and/or face orientation. The latter may correspond to a viewing direction of a user in the virtual environment. Accordingly, the orchestration system may obtain orientation data indicative of such orientation(s) and determine the grouping based on such data. Such orientation data may for example allow users which face each other in the virtual environment to be grouped together. Additionally, or alternatively, yet other types of data, such as video data, audio data and/or metadata, of the multidevice video session to may be used identify verbal or non-verbal social cues between participants of the multidevice video session. Such cues may for example include gaze direction, but also the mentioning of a name in a conversation indicating that one user is addressing another user. Such types of data may allow the orchestration system to determine the grouping of the users/devices. For example, if significant social cues exist between a set of participants, these participants may be allocated to a same group. It will be appreciated that the orchestration system may combine several types of data to arrive at the grouping of the user/devices. Such combinations may be made in various ways, for example by using a rule-based system, or by using a machine learned model which may be trained to identify such groupings based on these types of data, etc.

Additionally, or alternatively, to the above-mentioned types of data which may be used to determine the grouping, the orchestration system may be configured to take into account a selection of a group for at least one of the plurality of devices. Such a selection may be made elsewhere, e.g., by another entity and/or manually by a user him/herself. In a specific example, a client device may comprise a user interface subsystem to allow a user to manually select, or indicate a preference for, a group. The result of the selection may then be made available to the orchestration system in the form of selection data to allow the orchestration system to determine the grouping. Such a selection may be considered as an instruction commanding the orchestration system to allocate a particular user/device to a particular group, or as a preference. In the latter case, the preference may be weighted by the orchestration system with or against other factors or grouping cues so as to arrive at the grouping of users/devices.

Additionally, or alternatively to a client device providing selection data to the orchestration system, a client device may also report other types of data to the orchestration system to enable the orchestration system to determine the grouping. One example is that a client device may determining a distance of the device's user to other users in the virtual environment. Such distance data may then be reported to the orchestration system, which may then determine the grouping based at least in part on this data. Yet another example is that a client device may analyze conversational behavior of users, for example by analyzing speech, identifying gaze direction etc. The presence of such conversational behavior in relation to other users may be identified to the orchestration system, which may then determine the grouping based thereon.

Figure 4B:
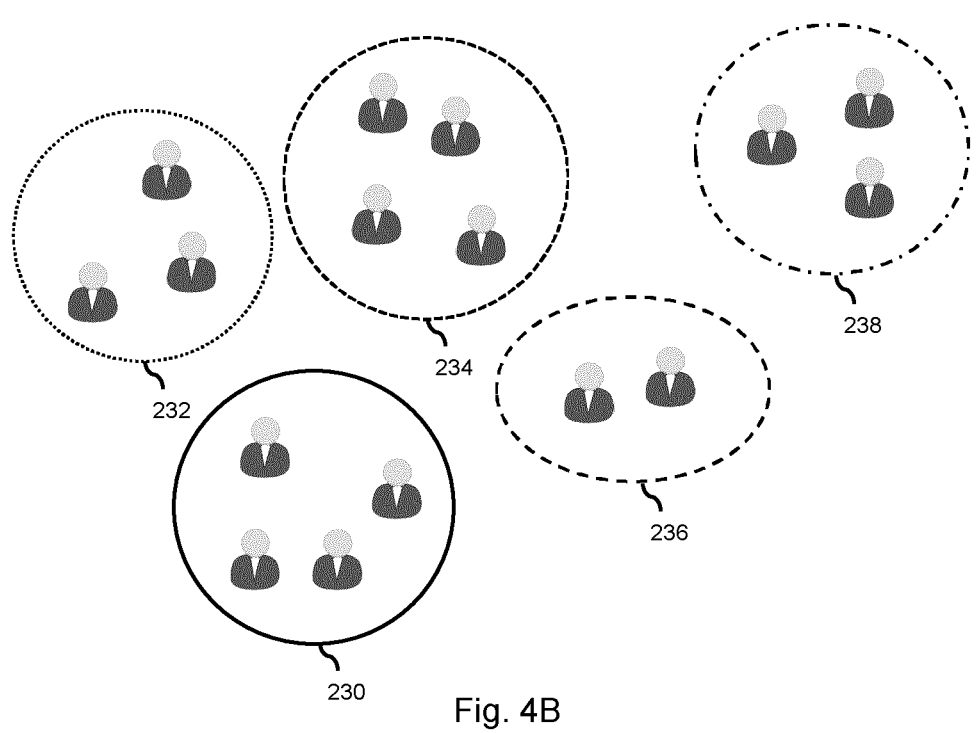
FIG. 4B shows a grouping of the video avatars based on distance.

FIG. 4B shows an exemplary result of a grouping of the video avatars 210 of FIG. 4A, and thus of the users/devices, into a number of groups 230-238, which may in the following Figs. also be indicated as groups A-E. It will be appreciated that the grouping is merely exemplary, and may in practice contain any number of users/devices, including in some cases overlapping or hierarchically structured groups.

In some examples, the orchestration system may provide instructions to the composition system which may cause the composition system to generate compositions of the videos of the devices in accordance with the groups. This may for example involve the composition system generating a 'mosaic'-like spatial arrangement of the videos of the users/devices within one group, or packaging the videos together, e.g., into a 'group view' video stream. In other examples, the composition system may render a part of the virtual environment, and may, based on the grouping of users/devices, separately render parts of the virtual environment which contain the users/devices of a particular group. As such, a group view may be generated by rendering a part of the virtual environment containing a group's video avatars.

Figure 5:
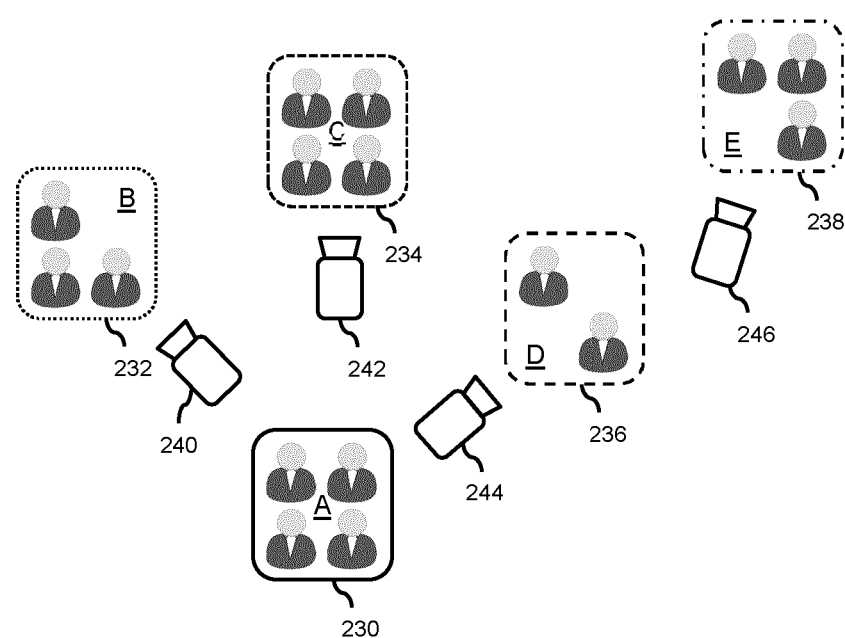
FIG. 5 illustrates compositions of the videos of the devices in the respective groups being generated by way of 'virtual cameras'.

FIG. 5 illustrates such compositions of the videos of the devices in the respective groups being generated by symbolically showing 'virtual cameras' 240-246 which may generate one or more video streams of the respective groups. It will be appreciated that such group-based representations may be specifically generated for other groups. For example, the composition system may provide the videos of the multidevice video session to a user/device from group A by sending individual video streams of the other users/devices from group A while in addition sending 'group view' video streams of the other groups. In general, based on the determined grouping, the orchestration system may provide instructions to the composition system to, when generating the one or more video streams for a device from one of the groups (e.g., group A), to include a quality-reduced version of respective videos of devices from at least one other group in the one or more video streams, said quality-reduced version having at least one quality characteristic reduced with respect to the videos of devices from group A. Such quality reduction may be obtained in various ways, for example by reducing a spatial resolution, reducing a temporal resolution, reducing an encoding quality, increasing a processing latency (e.g., by decreasing a priority of processing), increasing a transmission latency (e.g., by decreasing a priority of transmission), and decreasing a preprocessing quality when preprocessing a video (e.g., by selecting a different type of processing algorithm or by adjusting parameters of the algorithm). At least some types of quality reductions may be obtained by means of transcoding.

FIG. 6A symbolically shows a composition 250 of the videos for a device from group A, in which the grouping may determine a spatial resolution of the videos which are transmitted to the device. More specifically, videos shown larger in FIG. 6A may be transmitted at a higher spatial resolution than those videos which are shown smaller in FIG. 6A. It can be seen that the videos of the other users of group A may be shown at a higher spatial resolution than the videos of the users of other groups, e.g., of groups B-E. For example, the videos of other users of group A may be shown at the original spatial resolution as they may be received by the composition system from the transmitter devices, while the videos of the users of groups B-D may be shown at a reduced spatial resolution, while the videos of the users of group E may be shown at a further reduced spatial resolution. A reason for this may be that for a user from group A, other users from group A may be most relevant, while the users from nearby groups B-D may be of lesser relevance. Finally, the users from group E, which may be a far-way group (see also FIGS. 4A-4B), may be deemed to be of least relevance for the user from group A and may thus be most reduced in terms of spatial resolution.

FIG. 6B symbolically shows a composition 252 of the videos for a device from group E. It can be seen that the composition may be conceptually similar to that of FIG. 6A, in that the videos of other users of group E may be shown at a higher spatial resolution than the videos of the users of other groups, with in particular the videos of the users of the far-away group A being reduced most in spatial resolution.

It will be appreciated that if videos are reduced in quality, as for example the videos of group B when generating the one or more video streams for a device from group A, that such quality-reduced videos may be reused for devices from other groups, such as for devices from group E as in FIG. 6B. In particular, if a group view is generated of group B (or C or D), for example by generating a spatial mosaic or by rendering a part of the virtual environment, that such a group view may be reused for the devices of a number of other groups (e.g., A and E). It may thus not be needed to generate such quality-reduced versions of videos multiple times when generating the one or more video streams for different devices. Rather, such reduced-quality versions of videos may be reused for different devices and/or for devices of different groups.

It is further noted that FIGS. 6A and 6B show the one or more video streams for a device of a group being generated while omitting the device's own video. Namely, the device's own video may not need to be transmitted back to the device since it is already originally available at the device. However, in some examples, the video of a particular device may be included in the one or more video streams which are generated for this device. This may remove device dependencies; rather, the videos may only need to be generated in a group-dependent manner. Thus, video stream(s) generated for a device from group A may be re-used for other devices from group A.

With continued reference to the grouping, it will be appreciated that having determined a grouping, some of the groups may also be merged, for example on a group-dependent manner, to generate a single representation of a merged group. In the example of FIGS. 6A and 6B, a single group representation may be generated of groups B-D for any devices from group A and for any devices from group E.

Figure 7:
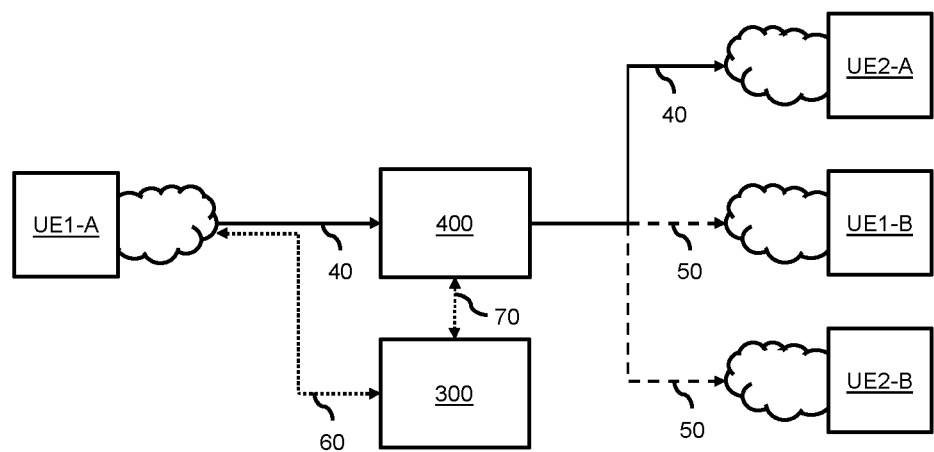
FIG. 7 shows an orchestration system instructing a composition system to transmit a video stream from a device from a group A to another device from group A in its original quality and to devices from group B at a reduced quality.

FIG. 7 shows an example of an orchestration system 300 instructing a composition system 400. In this particular example, only a subset of the video transmissions during a multidevice video session are shown, namely only showing how a video 40 from a first device UE1 from a group A (with the device being also referenced by UE1-A) may be transmitted to the composition system 400 which in turn may transmit the video at its original quality to another device UE2 from group A, while the orchestration system 300 may instruct the composition system 400 to transmit a reduced-quality version of the video 50 to the devices UE1, UE2 from a group B.

To be able to provide such instructions to the composition system 400, the orchestration system 300 may be in data communication 70 with the composition system 400. Such data communication may comprise sending instructions, e.g., as instruction data, but also metadata. For example, such metadata may be indicative of the grouping of the devices determined by the orchestration system 300. The instructions may for example specify the type of quality reduction, or in general that such a quality reduction is to be applied, e.g., for certain videos of certain groups. In other examples, a client device may provide its video at various quality levels to the composition system, either in response to or without an explicit instruction to do so, and the composition system may then select amongst the quality levels to obtain a version of the video to be sent to a receiver device in accordance with the grouping. Such different versions of a video may also be referred to as different 'representations' of the video, which may for example differ in spatial resolution, framerate, bitrate, etc.

In addition, the orchestration system 300 may be in data communication 60 with the client devices. This may for example allow orchestration system 300 to receive selection data from respective client devices. Alternatively, or additionally, this may enable the orchestration system 300 to send metadata to a client device which is indicative of the grouping of the videos of the other devices in the one or more video streams. Using the metadata, the client device may then render the videos of the other devices in accordance with the grouping to obtain rendered output for display. It will be appreciated that instead of the orchestration system 300 providing the abovementioned type of metadata to a client device, the metadata may alternatively be provided by the composition system 400 to the client device, for example in response to a grouping being determined by the orchestration system 300, or a grouping being updated.

Figure 8:
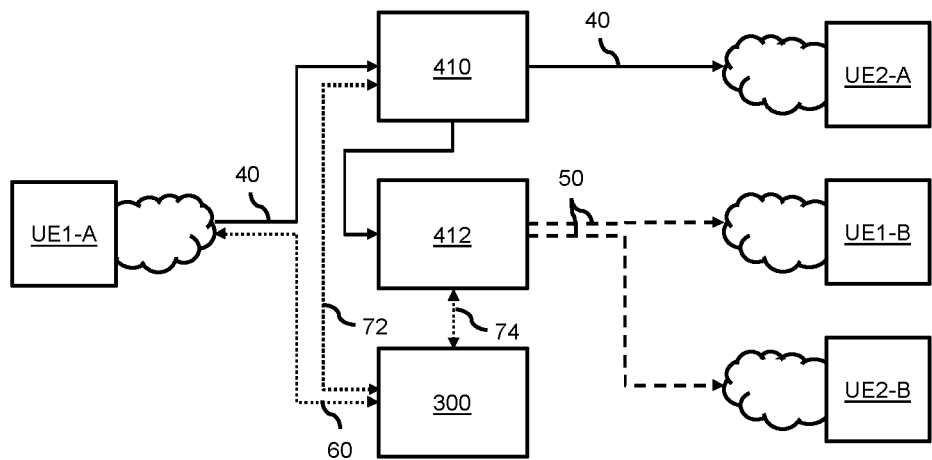
FIG. 8 shows a composition system comprised of an MCU and an SFU, with the orchestration system instructing the SFU to forward the video stream from the device from group A to the other device from group A in its original quality and instructing the MCU to transmit the video to devices from group B at a reduced quality.

FIG. 8 shows a specific example of the FIG. 7 example, in which the composition system is comprised of a multipoint control unit 412 (MCU) and a selective forwarding unit 410 (SFU) and in which again only a subset of the video transmissions during a multidevice video session are shown, namely only relating to the video of a device UE1-A. The orchestration system 300 may instruct the SFU 410 via data communication 72 to forward the video stream from the device from group A to the other device from group A at its original quality and instruct the MCU 412 via data communication 74 to transmit the video to devices from group B at a reduced quality, for example by transcoding the video 40 to obtain a reduced-quality version 50 thereof.

Another specific example may be the following. Each device may send one or more videos of a user which together show the user from different viewpoints, e.g., from different angles. The video(s) may comprise visible light data, e.g., normal video frames, and depth data, which together may allow an at least partial 3D representation of the user to be generated for use as a video avatar in a multidevice video session. For the multidevice video session, the orchestration system may select different sets of MCUs, for example one MCU for each identified group. Such selection may involve the orchestration system sending instructions to initiate an MCU, for example using a docker swarm. The client device may send its video(s) to one or more of the MCUs. For example, if the MCUs are geographically distributed, the client device may send its video(s) to a geographically nearest MCU. The orchestration system may negotiate to stream transmission for a client device, for example via WebRTC. Such negotiations may for example seek to accomplish that a client device uploads any stream(s) to one entity of the composition system, e.g., to one MCU, and that the composition system will systematically forward the stream(s) either internally to different MCUs or directly forward the stream(s) to client devices of a same group. For each identified group, the orchestration system may send composition instructions to MCUs. This may for example involve sending a web socket message that outlines the mosaic an MCU shall generate. This message may for example include:
  mosaic size, e.g., in terms of spatial resolution
  for each stream uploaded by a client device
    stream identifier (or receiving port)
      position in mosaic stream, which may identify the particular stream in the mosaic, for example by means of coordinates or by an identifier in case a predefined mosaic-type is used.

In addition, the orchestration system may inform a client device of a generated composition by the MCU(s), for example by a message which may include:
  the mosaic size
  for each stream in received mosaic
    the position in mosaic stream
    the stream identifier or user identifier While the above examples refer to mosaics, similar messages may be provided for any other type of composition generated by the composition system.

In general, a client device may transmit one or more videos which together show a user from different perspectives, e.g., from different angles, and from which an at least partial 3D representation of the user may be reconstructed. Such reconstruction may for example take place at a receiving device, or at the composition system which may then include the 3D representation in its composition In another example, a client device may send a point-cloud video to the composition system, e.g., of a type as described in [6]. The composition system may then merge all point-cloud videos of the devices of one group into a group representation, for example by simple data fusion on the geometrical space, with the group representation being afterwards reduced in quality to generate the quality reduced version thereof. Such data fusion may also comprise simply deleting some of the points that will not be visible by a user of a receiving device, for example because the points are occluded or too far away. Alternatively, the individual point-cloud videos may first be adjusted in quality and then combined into a group representation.

Figure 9:
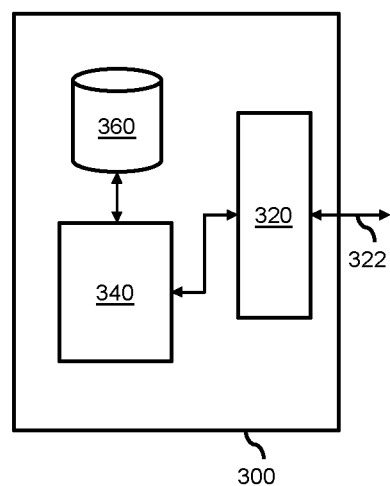
FIG. 9 shows an orchestration system for a multi-device video session.

FIG. 9 shows an orchestration server 300 for at least in part orchestrating a multidevice video session in which a plurality of devices each transmit a video via a network and in which a composition system receives said transmitted videos and composites, for a respective device from the plurality of devices, videos of other devices into one or more video streams and transmits the one or more video streams via the network to the device. The orchestration system 300 may comprise a communication interface via which the composition system may be reachable by data communication 322. In the example of FIG. 9, the communication interface may be a network interface 320 to a network via which the composition system may be reachable. The network interface 320 may for example be a wired communication interface, such as an Ethernet or fiber-optic based interface. The network may for example be the Internet or a mobile network, with the orchestration system 300 being connected to a fixed part of the mobile network. Alternatively, the network interface 320 may be a wireless communication interface, e.g., being of a type as described below for the client device 500 of FIG. 11. In other examples, for example in which the orchestration system 300 and the composition system are subsystems of a larger system, e.g., a supra-system, the communication interface may be an internal interface of the supra-system, such as an electronic bus or a virtual, software-based interface.

The orchestration system 300 may further comprise a processor subsystem 340 which may be configured, e.g., by hardware design or software, to perform the operations described in this specification in as far as pertaining to an orchestration system or in general to the orchestrating of a multidevice video session. In general, the processor subsystem 340 may be embodied by a single Central Processing Unit (CPU), such as a x86 or ARM-based CPU, but also by a combination or system of such CPUs and/or other types of processing units. In embodiments where the orchestration system 300 is distributed over different entities, e.g., over different servers, the processor subsystem 340 may also be distributed, e.g., over the CPUs of such different servers. As also shown in FIG. 9, the orchestration system 300 may comprise a data storage 360, such as a hard drive or an array of hard drives, a solid-state drive or an array of solid-state drives, etc., which may be used to store any type of data.

In a specific example, the orchestration system 300 may be implemented by a network node or a system of network nodes. In other examples, the orchestration system may be part of a composition system. In yet other examples, the orchestration system may be part of a client device, or distributed over different client devices.

Figure 10:
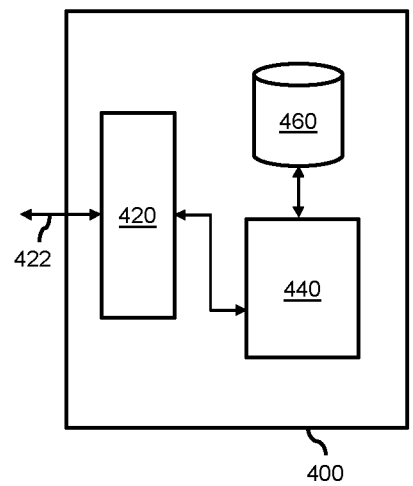
FIG. 10 shows a composition system for a multi-device video session.

FIG. 10 shows a composition system 400 for use in a multidevice video session. The composition system 400 may comprise a network interface 420 for data communication via a network 422. The network interface 420 may be of a type as described for the orchestration system 300 of FIG. 9 or the client device 500 of FIG. 11. The composition system 400 may further comprise a processor subsystem 440 which may be configured, e.g., by hardware design or software, to perform the operations described in this specification in as far as pertaining to the composition system or in general to the generating of one or more video streams for a device, which may include the generating of composite video streams. The processor subsystem 440 may be of a type as described for the orchestration system 300 of FIG. 9 or for the client device 500 of FIG. 11. As also shown in FIG. 10, the composition system 400 may comprise a data storage

460, such as a hard drive or an array of hard drives, a solid-state drive or an array of solid-state drives, etc., which may be used to store any type of data.

In general, the orchestration system 300 may be implemented by a network node or a system of network nodes. The network node(s) may be edge node(s).

Figures 11, 12:
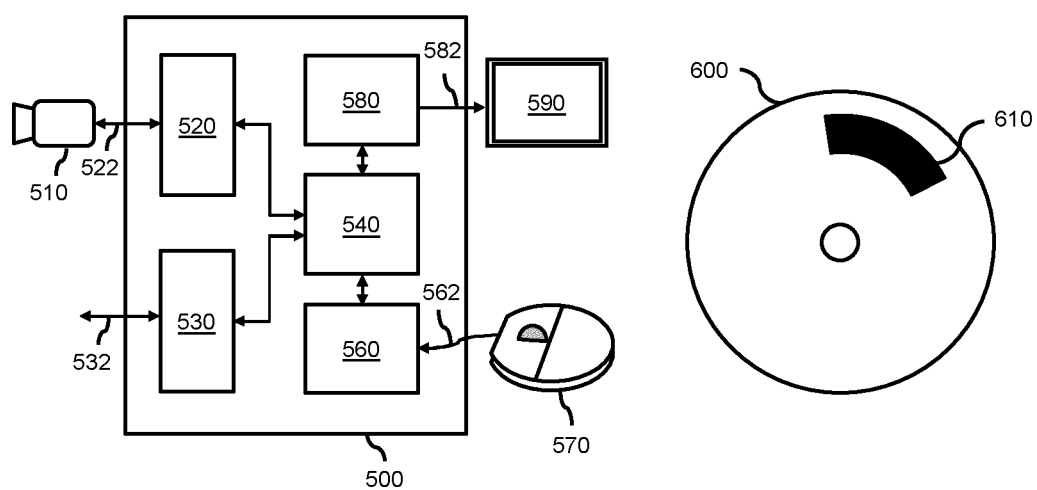
FIG. 11 shows a device for participating in a multi-device video session.
FIG. 12 shows a computer-readable medium comprising non-transitory data.

FIG. 11 shows a (client) device 500 for participating in a multidevice video session. The client device 500 may comprise a network interface 530 to a network so as to be able to communicate with a composition system via data communication 532. The network interface 530 may for example be a wireless communication interface, which may also be referred to as a radio interface, and which may be configured to connect to a mobile network infrastructure. In some examples, the network interface 530 may comprise a radio and an antenna, or a radio and an antenna connection. In a specific example, the network interface 530 may be a 4G or 5G radio interface for connecting to a 4G or 5G mobile network adhering to one or more 3GPP standards, or a Wi-Fi communication interface for connecting to a Wi-Fi network infrastructure, etc. In other examples, the network interface 530 may be a wired communication interface, for example of a type as described for the orchestration system 300 of FIG. 9 or the composition system 400 of FIG. 10. It is noted that the data communication between the client device 300 and the composition system 400 may involve multiple networks. For example, the client device may be connected via a radio access network to a mobile network's infrastructure and via the mobile network's infrastructure to the Internet, with the streaming server being a server which is also connected to the Internet.

The client device 500 may further comprise a camera interface 520 by which the processor system 540 may obtain the real-time recording of the user, e.g., by receiving camera data 522 from a connected camera 510. In other examples, the client device 500 may comprise the camera as an internal component. In yet other examples, the client device 500 may omit the camera interface but instead retrieve the video from elsewhere, e.g., from a built-in storage, another network-connected entity, etc.

The client device 500 may further comprise a processor subsystem 540 which may be configured, e.g., by hardware design or software, to perform the operations described in this specification in as far as pertaining to a client device or UE or in general to the client-side sending and receiving of video in a multidevice video session. In general, the processor subsystem 540 may be embodied by a single Central Processing Unit (CPU), such as a x86 or ARM-based CPU, but also by a combination or system of such CPUs and/or other types of processing units, such as Graphics Processing Units (GPUs). The client device 500 may further comprise a display output 580 for outputting display data 582 to a display 590. The display 590 may be an external display or an internal display of the client device 500 (FIG. 11 shows an external display), and in general may be head-mounted or non-head mounted. Using the display output 580, the client device 500 may display received video of the multidevice video session. In some embodiments, this may involve the processor subsystem 540 rendering a virtual environment which includes the received video(s), with the term 'rendering' referring to one or more process steps by which the data defining the virtual environment and video(s) may be converted into a displayable form. The rendered data may then be provided to the display output 580.

The client device 500 may further comprise a user interface subsystem via which a user may interact with the client device 500, for example using a graphical user interface (GUI). The user interface subsystem may comprise a user input interface 560 which may be configured to receive user input data 562 from a user input device 570 operable by a user. The user input device 570 may take various forms, including but not limited to a computer mouse, touch screen, keyboard, microphone, etc. By way of example, FIG. 11 shows the user input device to be a computer mouse 570. In general, the user input interface 560 may be of a type which corresponds to the type of user input device 570, i.e., it may be a thereto corresponding type of user device interface. The user interface subsystem may further comprise the aforementioned display output 58 to display graphical elements of a user interface, or an entire GUI, to a user.

In general, the client device 500 may be embodied by a (single) device or apparatus, e.g., a smartphone, personal computer, laptop, tablet device, gaming console, set-top box, television, monitor, projector, smart watch, smart glasses, media player, media recorder, etc. In some examples, the client device 500 may be a so-called User Equipment (UE) of a mobile telecommunication network, such as a 5G or next-gen mobile network. In other examples, the client device may be an edge node of a network, such as an edge node of the aforementioned mobile telecommunication. In such examples, the client device may lack a display output, or at least may not use the display output to display the received video data. Rather, the client device may receive one or more video streams from a composition system, which may be made available for streaming to a further downstream client device, such as an end-user device.

In general, each entity described in this specification may be embodied as, or in, a device or apparatus. The device or apparatus may comprise one or more (micro)processors which execute appropriate software. The processor(s) of a respective entity may be embodied by one or more of these (micro)processors. Software implementing the functionality of a respective entity may have been downloaded and/or stored in a corresponding memory or memories, e.g., in volatile memory such as RAM or in non-volatile memory such as Flash. Alternatively, the processor(s) of a respective entity may be implemented in the device or apparatus in the form of programmable logic, e.g., as a Field-Programmable Gate Array (FPGA). Any input and/or output interfaces may be implemented by respective interfaces of the device or apparatus. In general, each functional unit of a respective entity may be implemented in the form of a circuit or circuitry. A respective entity may also be implemented in a distributed manner, e.g., involving different devices or apparatus.

It is noted that any of the methods described in this specification, for example in any of the claims, may be implemented on a computer as a computer implemented method, as dedicated hardware, or as a combination of both. Instructions for the computer, e.g., executable code, may be stored on a computer-readable medium 600 as for example shown in FIG. 12, e.g., in the form of a series 610 of machine-readable physical marks and/or as a series of elements having different electrical, e.g., magnetic, or optical properties or values. The executable code may be stored in a transitory or non-transitory manner. Examples of computer-readable mediums include memory devices, optical storage devices, integrated circuits, servers, online software, etc. FIG. 12 shows by way of example an optical storage device 600.

In an alternative embodiment of the computer-readable medium 600, the computer-readable medium 600 may comprise transitory or non-transitory data 610 in the form of a data structure representing any type of metadata described in this specification, or representing any type of instructions described in this specification.

Figure 13:
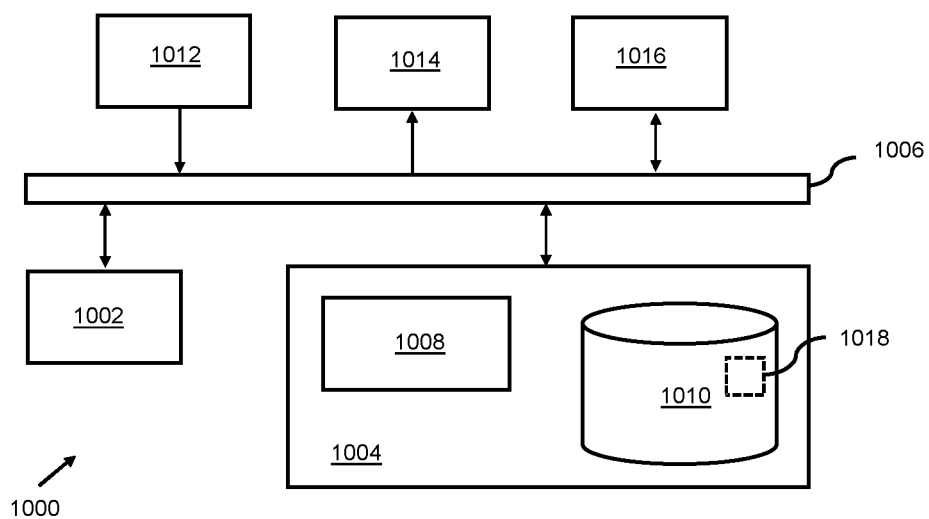
FIG. 13 shows an exemplary data processing system.

FIG. 13 is a block diagram illustrating an exemplary data processing system 1000 that may be used in the embodiments described in this specification. Such data processing systems include data processing entities described in this specification, including but not limited to the orchestration system, client device (e.g., UE) and composition system (e.g., MCU, SFU or any combination of MCU(s) and SFU(s)).

The data processing system 1000 may include at least one processor 1002 coupled to memory elements 1004 through a system bus 1006. As such, the data processing system may store program code within memory elements 1004. Furthermore, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

The memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The data processing system 1000 may also include one or more cache memories (not shown) that provide temporary storage of at least some program code in order to reduce the number of times program code is otherwise retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture-based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 13, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

For example, data processing system 1000 may represent an orchestration system as described with reference to FIG. 9 and elsewhere in this specification. In that case, application 1018 may represent an application that, when executed, configures data processing system 1000 to perform the functions described with reference to said entity. In another example, data processing system 1000 may represent a composition system as described with reference to FIG. 10 and elsewhere in this specification. In that case, application 1018 may represent an application that, when executed, configures data processing system 1000 to perform the functions described with reference to said entity. In another example, data processing system 1000 may represent a (client) device as described with reference to FIG. 11 and elsewhere in this specification. In that case, application 1018 may represent an application that, when executed, configures data processing system 1000 to perform the functions described with reference to said entity.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An orchestration system for at least in part orchestrating a multidevice video session in which a plurality of devices each transmit a video via a network and in which a composition system receives said transmitted videos and composites, for a respective device from the plurality of devices, videos of other devices into one or more video streams and transmits the one or more video streams via the network to the device, wherein the multidevice video session takes place, at least in part, in a virtual environment, wherein the virtual environment comprises objects displaying the videos of the other devices, the orchestration system comprising:
　a communication interface for communicating with the composition system;
　a processor subsystem configured to:
　　obtain positional data indicative of relative positions of the objects in the virtual environment;
　　determine a grouping of the plurality of devices based on the positional data, the grouping including at least a first group of devices and a second group of devices, by applying a clustering analysis to the positional data to identify at least a first cluster representing the first group and a second cluster representing the second group;

via the communication interface, provide instructions to the composition system to, when generating the one or more video streams for a device from the first group, include a quality-reduced version of respective videos of devices from the second group in the one or more video streams, said quality-reduced version having at least one quality characteristic reduced with respect to the videos of devices from the first group.

2. The orchestration system according to claim 1, wherein the processor subsystem is configured to:

generate metadata which is indicative of the grouping of the videos of the other devices in the one or more video streams; and via the communication interface, provide the metadata to the composition system for transmittal to the device from the first group, or directly to the device from the first group, to enable the device to identify and render the videos of the other devices in accordance with the grouping.

3. The orchestration system according to claim 1, wherein the processor subsystem is configured to:

provide instructions to at least one device from the second group to generate the quality-reduced version of a respective video and to transmit the quality-reduced version to the composition system, wherein the instructions to the composition system instruct the composition system to include the quality-reduced version in the one or more video streams for the device from the first group.

4. The orchestration system according to claim 1, wherein the processor subsystem is configured to:

via the instructions to the composition system, instruct the composition system to generate the quality-reduced version from respective videos received from the devices from the second group, for example by transcoding the respective videos.

5. The orchestration system according to claim 4, wherein the composition system comprises a multipoint control unit, MCU, and a selective forwarding unit, SFU, wherein the processor subsystem is configured to instruct the composition system to generate the one or more video streams for the device from the first group by:

instructing the multipoint control unit to generate the quality-reduced version from the respective videos received from the devices from the second group and to composite said quality-reduced versions into a composite video stream;

instructing the selective forwarding unit to forward videos from other devices from the first group to the device from the first group.

6. A composition system for use in a multidevice video session, the composition system comprising:

a network interface to a network;
a processor subsystem configured to:
via the network interface, receive videos transmitted by a plurality of devices which participate in the multidevice video session;
for a respective device from the plurality of devices, composite videos of other devices into one or more video streams, wherein the multidevice video session takes place, at least in part, in a virtual environment, wherein the virtual environment comprises objects displaying the videos of the other devices; and
via the network interface, transmit the one or more video streams to the device;
a communication interface to an orchestration system;
wherein the processor subsystem is further configured to:
via the communication interface, receive instructions from the orchestration system, wherein the instructions indicate to include a quality-reduced version of respective videos of devices from a second group from the plurality of devices in the one or more video streams, said quality-reduced version having at least one quality characteristic reduced with respect to videos of devices from a first group from the plurality of devices, the grouping of the plurality of devices based on positional data indicative of relative positions of the objects in the virtual environment, determined by applying a clustering analysis to the positional data to identify at least a first cluster representing the first group and a second cluster representing the second group;
based on the instructions, when generating the one or more video streams for a device from the first group, include the quality-reduced version of the respective videos of devices from the second group in the one or more video streams.

7. The composition system according to claim 6, wherein the at least one quality characteristic which is reduced is at least one of:

a spatial resolution,
a temporal resolution,
an encoding quality,
a processing latency,
a transmission latency, and
a preprocessing quality when preprocessing a video.

8. The composition system according to claim 6, wherein the processor subsystem is configured to, based on the instructions, generate the quality-reduced version from respective videos received from the devices from the second group, by transcoding the respective videos.

9. The composition system according to claim 6, wherein the processor subsystem is configured to generate the one or more video streams by:

generating a composite video stream which includes the videos of the devices from the first group and the second group; or
generating at least a composite video stream which includes the videos of the devices from the second group in separation of the videos of the devices from the first group.

10. The composition system according to claim 6, wherein the plurality of devices is grouped into the first group, the second group and at least a third group, wherein the composition system is configured to:

use the reduced quality version of the respective videos of the devices from the second group for generating the one or more video streams for the device from the first group and for a device from the third group.

11. The composition system according to claim 6, wherein the composition system comprises at least one of:

a multipoint control unit (MCU); and
a selective forwarding unit (SFU).

12. The composition system according to claim 6, wherein:

the composition system comprises the orchestration system; or
the composition system and the orchestration system are respective subsystems of another system.

13. A device for participating in a multidevice video session in which a plurality of devices each transmit a video via a network and in which a composition system receives said transmitted videos and composites, for the device, videos of other devices of the plurality of devices into one or more video streams and transmits the one or more video streams via the network to the device, wherein the multidevice video session takes place, at least in part, in a virtual environment, wherein the virtual environment comprises objects displaying the videos of the other devices, the device comprising:
- a camera interface to a camera;
- a network interface to the network;
- a processor subsystem configured to:
  - using the camera interface, obtain video of the camera;
  - via the network interface, transmit the video to the composition system, and receive one or more video streams, wherein the one or more video streams comprise the videos of the other devices in accordance to a grouping, the grouping including at least a first group of devices and a second group of devices;
  - via the network interface, receive metadata which is indicative of the grouping of the videos of the other devices in the one or more video streams, the grouping of the plurality of devices based on positional data indicative of relative positions of the objects in the virtual environment, determined by applying a clustering analysis to the positional data to identify at least a first cluster representing the first group and a second cluster representing the second group;
  - using the metadata, render the videos of the other devices in accordance with the grouping to obtain rendered output for display.

14. A computer-implemented method for at least in part orchestrating a multidevice video session in which a plurality of devices each transmit a video via a network and in which a composition system receives said transmitted videos and composites, for a respective device from the plurality of devices, videos of other devices into one or more video streams and transmits the one or more video streams via the network to the device, wherein the multidevice video session takes place, at least in part, in a virtual environment, wherein the virtual environment comprises objects displaying the videos of the other devices, the method comprising:
- obtain positional data indicative of relative positions of the objects in the virtual environment;
- determining a grouping of the plurality of devices based on the positional data, the grouping including at least a first group of devices and a second group of devices, by applying a clustering analysis to the positional data to identify at least a first cluster representing the first group and a second cluster representing the second group;
- providing instructions to the composition system to, when generating the one or more video streams for a device from the first group, include a quality-reduced version of respective videos of devices from the second group in the one or more video streams, said quality-reduced version having at least one quality characteristic reduced with respect to the videos of devices from the first group.

15. A computer-implemented method for compositing videos in a multidevice video session, the method comprising:
- receiving videos transmitted by a plurality of devices which participate in the multidevice video session;
- for a respective device from the plurality of devices, compositing videos of other devices into one or more video streams, wherein the multidevice video session takes place, at least in part, in a virtual environment, wherein the virtual environment comprises objects displaying the videos of the other devices; and
- transmitting the one or more video streams to the device; wherein the method further comprises:
- receiving instructions from the orchestration system, wherein the instructions indicate to include a quality-reduced version of respective videos of devices from a second group from the plurality of devices in the one or more video streams, said quality-reduced version having at least one quality characteristic reduced with respect to videos of devices from a first group from the plurality of devices, the grouping of the plurality of devices based on positional data indicative of relative positions of the objects in the virtual environment, determined by applying a clustering analysis to the positional data to identify at least a first cluster representing the first group and a second cluster representing the second group;
- based on the instructions, when generating the one or more video streams for a device from the first group, including the quality-reduced version of the respective videos of devices from the second group in the one or more video streams.

16. A computer-implemented method of operating a device participating in a multidevice video session in which a plurality of devices each transmit a video via a network and in which a composition system receives said transmitted videos and composites, for the device, videos of other devices of the plurality of devices into one or more video streams and transmits the one or more video streams via the network to the device, the method comprising, wherein the multidevice video session takes place, at least in part, in a virtual environment, wherein the virtual environment comprises objects displaying the videos of the other devices, by the device:
- obtaining video of a camera connected to the device;
- transmitting the video to the composition system;
- receiving one or more video streams, wherein the one or more video streams comprise the videos of the other devices in accordance to a grouping, the grouping including at least a first group of devices and a second group of devices;
- receiving metadata which is indicative of the grouping of the videos of the other devices in the one or more video streams, the grouping of the plurality of devices based on positional data indicative of relative positions of the objects in the virtual environment, determined by applying a clustering analysis to the positional data to identify at least a first cluster representing the first group and a second cluster representing the second group; and
- using the metadata, rendering the videos of the other devices in accordance with the grouping to obtain rendered output for display.

17. A non-transitory computer-readable medium comprising transitory or non-transitory data representing a computer program, the computer program comprising instructions for causing a processor system to perform the method according to claim 14.

* * * * *